United States Patent
Ono et al.

(10) Patent No.: US 12,099,235 B2
(45) Date of Patent: Sep. 24, 2024

(54) AMPLIFYING FIBER AND OPTICAL AMPLIFIER

(71) Applicant: Nippon Telegraph and Telephone Corporation, Tokyo (JP)

(72) Inventors: Hirotaka Ono, Tokyo (JP); Yutaka Miyamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 237 days.

(21) Appl. No.: 17/427,248

(22) PCT Filed: Jan. 30, 2020

(86) PCT No.: PCT/JP2020/003499
§ 371 (c)(1),
(2) Date: Jul. 30, 2021

(87) PCT Pub. No.: WO2020/162327
PCT Pub. Date: Aug. 13, 2020

(65) Prior Publication Data
US 2022/0120960 A1    Apr. 21, 2022

(30) Foreign Application Priority Data
Feb. 6, 2019   (JP) .................. 2019-019845

(51) Int. Cl.
*G02B 6/02* (2006.01)
*G02B 6/028* (2006.01)
*H01S 3/067* (2006.01)

(52) U.S. Cl.
CPC .............. *G02B 6/028* (2013.01); *H01S 3/067* (2013.01)

(58) Field of Classification Search
CPC .............................. G02B 6/028; H01S 53/067
See application file for complete search history.

(56) References Cited

U.S. PATENT DOCUMENTS 6,496,303 B1 * 12/2002 Fleming .............. H01S 3/10023
359/337.2
6,611,648 B2 * 8/2003 Kumar ............... G02B 6/02042
385/126

(Continued)

FOREIGN PATENT DOCUMENTS

JP   H0926379   1/1997
JP   2002141586   5/2002

(Continued)

OTHER PUBLICATIONS

Abedin et al., "Cladding-pumped erbium-doped multicore fiber amplifier," Opt. Express 20, 20191-20200 (2012) (Year: 2012).*

(Continued)

*Primary Examiner* — Peter Radkowski
(74) *Attorney, Agent, or Firm* — Fish & Richardson P.C.

(57) ABSTRACT

An amplification fiber includes a core which is doped with an erbium ion and a cladding which surrounds the core and has a refractive index lower than a refractive index of the core, and a relative refractive index difference $\Delta n_{S1}$ between the core and the cladding is not more than a smaller one of values of a relative refractive index difference $\Delta n_1$ expressed as a predetermined expression related to a radius a of the core and a relative refractive index difference $\Delta n_2$ expressed as a predetermined expression related to the radius a of the core.

12 Claims, 13 Drawing Sheets

(56) References Cited

U.S. PATENT DOCUMENTS

| | | | |
|---|---|---|---|
| 9,025,239 B2* | 5/2015 | Zhu | H01S 3/06754 359/341.1 |
| 9,164,228 B2* | 10/2015 | Hayashi | G02B 6/4401 |
| 9,225,141 B2* | 12/2015 | Tsuchida | H01S 3/06754 |
| 9,231,365 B1* | 1/2016 | Wisk | H01S 3/302 |
| 9,263,846 B2* | 2/2016 | Li | H01S 3/067 |
| 9,673,589 B2* | 6/2017 | Hosokawa | H01S 3/06725 |
| 9,698,557 B2* | 7/2017 | Hosokawa | H01S 3/06729 |
| 9,722,388 B2* | 8/2017 | Tadakuma | H01S 3/10023 |
| 10,605,982 B2* | 3/2020 | Nagano | G02B 6/02042 |
| 2002/0033998 A1 | 3/2002 | Kakui et al. | |
| 2002/0176677 A1* | 11/2002 | Kumar | G02B 6/02042 385/126 |
| 2013/0088771 A1* | 4/2013 | Li | H01S 3/067 359/341.1 |
| 2013/0251320 A1* | 9/2013 | Hayashi | G02B 6/02042 385/100 |
| 2014/0168756 A1* | 6/2014 | Zhu | H01S 3/06754 385/127 |
| 2014/0240819 A1* | 8/2014 | Tsuchida | G02B 6/02042 359/341.5 |
| 2015/0364897 A1* | 12/2015 | Wisk | H01S 3/302 359/334 |
| 2016/0118762 A1* | 4/2016 | Tadakuma | H01S 3/06783 359/341.1 |
| 2016/0268757 A1* | 9/2016 | Hosokawa | H01S 3/094069 |
| 2017/0054266 A1* | 2/2017 | Hosokawa | H01S 3/1603 |
| 2019/0041575 A1* | 2/2019 | Nagano | G02B 6/02138 |

FOREIGN PATENT DOCUMENTS

| | | |
|---|---|---|
| JP | 2002158384 | 5/2002 |
| JP | 2015090969 | 5/2015 |
| JP | 2017021070 | 1/2017 |
| JP | 2018198287 | 12/2018 |

OTHER PUBLICATIONS

Amin et al., (2019). Doping radius effects on an erbium-doped fiber amplifier. Chinese Optics Letters. 17. 10.3788/COL201917.010602. (Year: 2019).*

Bai et al., "Multimode fiber amplifier with tunable modal gain using a reconfigurable multimode pump," Opt. Express 19, 16601-16611 (2011) (Year: 2011).*

Cokrak et al., Gain and Noise Figure Performance of Erbium Doped Fiber Amplifiers (EDFA). Istanbul University, Journal of Electrical & Electronics Engineering, V. 4, N. 2, 1111-1122, 2004 (Year: 2014).*

Gaur et al., "Design and Analysis of Annulus Core Few Mode EDFA for Modal Gain Equalization," in IEEE Photonics Technology Letters, vol. 28, No. 10, pp. 1057-1060, May 15, 15, 2016, doi: 10.1109/LPT.2016.2528502. (Year: 2016).*

Herbster et al., EDFA Design and Analysis for WDM Optical Systems Based on Modal Multiplexing , Journal of Microwaves, Optoelectronics and Electromagnetic Applications, vol. 16, No. 1, Mar. 2017 DOI: http://dx.doi.org/10.1590/2179-10742017v16i1882 (Year: 2017).*

Kang et al., "Minimizing differential modal gain in cladding-pumped EDFAs supporting four and six mode groups," Opt. Express 22, 21499-21507 (2014) (Year: 2014).*

Krummrich et al., "Selection of energy optimized pump concepts for multi core and multi mode erbium doped fiber amplifiers," Opt. Express 22, 30267-30280 (2014) (Year: 2014).*

Le Cocq et al., "Modeling and characterization of a few-mode EDFA supporting four mode groups for mode division multiplexing," Opt. Express 20, 27051-27061 (2012) (Year: 2012).*

Macho et al., (2018). Multi-Core Optical Fibers: Theory, Applications and Opportunities. 10.5772/intechopen.72458. (Year: 2018).*

Macho et al., "Unified Model of Linear and Nonlinear Crosstalk in Multi-Core Fiber," in Journal of Lightwave Technology, vol. 34, No. 13, pp. 3035-3046, 1 Jul. 1, 2016, doi: 10.1109/JLT.2016.2552958. (Year: 2016).*

Nagaraju et al., Design and fabrication of an intrinsically gain flattened Erbium doped fiber amplifier, Optics Communications, vol. 282, Issue 12, 2009, pp. 2335-2338, ISSN 0030-4018, https://doi.org/10.1016/j.optcom.2009.02.063. (Year: 2009).*

Ono et al., Recent progress on few-mode fiber amplifier, 2016 IEEE Photonics Society Summer Topical Meeting Series (SUM), Newport Beach, CA, USA, 2016, pp. 74-75, doi: 10.1109/PHOSST.2016.7548734. (Year: 2016).*

Ono et al., "Pump Power Reduction in Optical Fiber Amplifier for WDM-Interleaved Multi-Core/Multi-Fiber System," in IEEE Photonics Technology Letters, vol. 29, No. 14, pp. 1163-1166, 15 Jul. 15, 2017, doi: 10.1109/LPT.2017.2707470. (Year: 2017).*

Ren et al., A study on the coupling coefficients for multi-core fibers, Optik, vol. 127, Issue 6, 2016, pp. 3248-3252, ISSN 0030-4026, https://doi.org/10.1016/j.ijleo.2015.12.021. (Year: 2016).*

Rieznik et al., Study on optimum fiber length for maximum gain in C- and L-band EDFAs, Optics Communications, vol. 266, Issue 2, 2006, pp. 546-551, ISSN 0030-4018, https://doi.org/10.1016/j.optcom.2006.07.038. (Year: 2006).*

Sun et al., "Average inversion level, modeling, and physics of erbium-doped fiber amplifiers," in IEEE Journal of Selected Topics in Quantum Electronics, vol. 3, No. 4, pp. 991-1007, Aug. 1997, doi: 10.1109/2944.649527. (Year: 1997).*

Chen et al., Integrated cladding-pumped multicore few-mode erbium-doped fibre amplifier for space-division-multiplexed communications. Nature Photon 10, 529-533 (2016). (Year: 2017).*

M. Wada et al., "Cladding Pumped Randomly Coupled 12-Core Erbium-Doped Fiber Amplifier With Low Mode-Dependent Gain," in Journal of Lightwave Technology, vol. 36, No. 5, pp. 1220-1225, Mar. 1 and Jan. 25, 2018, doi: 10.1109/JLT.2018.2797902. (Year: 2018).*

Ono, Hirotaka, Optical Amplification Technologies for Space Division Multiplexing, Feature Articles: State-of-the-art Space Division Multiplexing Technologies for Future High-capacity Optical Transport Networks, NTT Technical Review, 2017 (Year: 2017).*

Ono et al., 2-LP mode few-mode fiber amplifier employing ring-core erbium-doped fiber, Opt. Express 23, 27405-27418 (2015) (Year: 2015).*

C. Matte-Breton, H. Chen, N. K. Fontaine, R. Ryf, R.-J. Essiambre, C. Kelly, C. Jin, Y. Messaddeq, and Sophie LaRochelle, "Demonstration of an erbium-doped fiber with annular doping for low gain compression in cladding-pumped amplifiers," Opt. Express 26, 26633-26645 (2018) (Year: 2011).*

Ono et al., Amplification method for crosstalk reduction in multi-core fibre amplifier, Electronics Letters, 2013, V. 49, N. 2 (Year: 2013).*

Furukawa Electric Co., Ltd., "Development of Compact Erbium Doped Fiber Amplifier with Fast Transient Control," Furukawa Electric Times, Jul. 2005, 116:79-80, 5 pages (With English Translation).

Mimura et al., "Batch Multicore Amplification with Cladding-Pumped Multicore EDF," ECOC 2012 Technical Digest, Sep. 15, 2012, 3 pages.

Sugimoto et al., "Ultra-Fast Automatic Gain Controlled Optical Fiber Amplifier," Fujikura Technical Report, 2009, 1(116): 1-5, 11 pages (With English Translation).

Yamada et al., "Gain Control in Multi-Core Erbium/Ytterbium-Doped Fiber Aplifier with Hybrid Pumping, " Proc. OECC 2016, Jul. 3, 2016, 3 pages.

* cited by examiner

AMPLIFYING FIBER AND OPTICAL AMPLIFIER

CROSS-REFERENCE TO RELATED APPLICATIONS

This application is a National Stage application under 35 U.S.C. § 371 of International Application No. PCT/JP2020/003499, having an International Filing Date of Jan. 30, 2020, which claims priority to Japanese Application Serial No. 2019-019845, filed on Feb. 6, 2019. The disclosure of the prior application is considered part of the disclosure of this application, and is incorporated in its entirety into this application.

TECHNICAL FIELD

The present invention relates to an amplification fiber which can be used as an amplification medium of an optical fiber amplifier, and an optical amplifier.

BACKGROUND ART

A large-capacity optical transmission system adopts a wavelength division multiplexing (WDM) transmission method in which signal lights having a plurality of wavelengths which are different from each other are multiplexed and transmitted in one fiber in long-distance WDM transmission, an erbium doped optical fiber amplifier (EDFA) is used in an optical repeater, and a 1.5 μm band is used as a transmission wavelength band.

In an optical network which uses the WDM transmission method, a difference in span loss caused by a difference in the distance between optical nodes is present and the span loss also fluctuates due to contact with a fiber and aging, and the number of channels is changed due to switching of an optical path, addition or removal of equipment, and trouble of an optical communication node. The fluctuation of the span loss and the change of the number of channels change the input signal light power of the EDFA used in the optical network. The EDFA used in the WDM transmission needs to amplify the individual signal lights having a plurality of wavelengths with the same gain, and hence the EDFA is designed such that the wavelength dependence of the gain is flat in the transmission wavelength band. However, in the case where the wavelength dependence of the gain is flat with the input signal light power of a given signal light, when the input signal light power of the EDFA is changed, the wavelength dependence of the gain of the EDFA ceases to be flat, and a gain tilt occurs. When the gain tilt occurs, the signal light which cannot obtain a sufficient gain or the signal light which has an extremely large gain is produced, and transmission characteristics of the optical network are degraded. Consequently, in the EDFA used in the optical network which uses the WDM transmission method, gain control needs to be performed such that the gain is always constant and the wavelength dependence of the gain is flat with respect to the change of the input signal light power.

One of methods of the gain control of the EDFA is an excitation light power control method in which an excitation light power is increased or decreased in response to increase and decrease of the input signal light power and the wavelength dependence of the gain is always kept flat even when the input signal light power is changed. In the EDFA, a semiconductor laser (Laser Diode: LD) is used as an excitation light source. The increase and decrease of the excitation light power are performed by increasing and decreasing injection current (drive current of an LD drive circuit) to the LD with a feedback control circuit.

In particular, to cope with the change of the input signal light power caused by change of the number of wavelengths of a WDM signal, it is necessary to adjust the excitation light power at high speed to control the gain at high speed. For example, FIG. 13 shows examples of numerical calculation of a transient response of an EDFA gain (a broken line in FIG. 13) in the case under a condition that the excitation light power is constant when the input signal light power of the EDFA is decreased at time t=0, and a transient response at the time of the gain control by the excitation light power control method (a solid line in FIG. 13) when the input signal light power of the EDFA is decreased at time t=0. As indicated by the broken line in FIG. 13, under the condition that the excitation light power is constant, due to the sharp decrease of the input signal light power, the gain of the EDFA (gain change in FIG. 13) is sharply increased. On the other hand, by performing the excitation light power control, the sharp change of the gain of the EDFA is suppressed to a certain degree. However, each of the feedback control circuit and the LD drive circuit has a limited response time period, and hence the gain of the EDFA immediately after the decrease of the input signal light power is sharply increased. In the case where the input signal light power is sharply increased, the gain of the EDFA is sharply decreased. The sharp change of the gain of the EDFA described above causes the sharp change of the signal light power, and leads to degradation of transmission characteristics of the optical network.

For example, in a transmission system disclosed in NPL 1, the decrease of the input signal light power is 15 dB (i.e., change of 32 waves→1 wave) and, in a transmission system disclosed in NPL 2, the decrease of the input signal light power is 16 dB (i.e., change of 40 waves→1 wave). Although the decrease amounts of the input signal light powers are different from each other, the change of the gain of the EDFA in the transmission system disclosed in each of NPL 1 and NPL 2 is about 1.0 dB. The throughput of the LD drive circuit having high feasibility is said to be several hundred kilohertz a band of 1 MHz with several taps and, in order to cope with such a throughput, the gain change speed of the EDFA needs to be lower than about 0.2 dB/μs.

In order to rapidly increase the transmission capacity of the optical transmission system, the development of a multi-core optical transmission system which uses a multi-core fiber having a plurality of cores in one fiber as a transmission line is in progress. By propagating WDM signals which transmit different pieces of information to the individual cores of the multi-core fiber, it is possible to rapidly increase the transmission capacity as compared with the case where a single-core fiber having one core in one fiber is used as the transmission line, as in a conventional case. In a long-distance multi-core optical transmission system, the signal light, the intensity of which is reduced during transmission, is amplified, and hence, similarly to the optical transmission system which uses the conventional single-core fiber as the transmission line, a multi-core fiber EDFA is used.

For example, NPL 3 discloses a cladding-pumped multi-core fiber EDFA including a plurality of cores doped with erbium ions and a double cladding structure having a first cladding on an inner side in a radial direction and a second cladding on the outer side of the first cladding. In the cladding-pumped multicore fiber EDFA disclosed in NPL 3, the refractive index of the first cladding is lower than the refractive index of the core. In addition, the cladding-pumped multicore fiber EDFA disclosed in NPL 3 includes a double-cladding erbium-doped fiber having the refractive index higher than that of the second cladding, and one high-output multi-mode excitation light source. In the cladding-pumped multicore fiber EDFA, even when the output light power of the multi-mode excitation light source is simply adjusted, it is not possible to perform the gain control at the time of the change of the input signal light power described above. That is, even when the input signal light power of a given core changes, the input signal light power of another core does not necessarily change similarly to the input signal light power of the given core. Consequently, the cladding-pumped multicore fiber EDFA disclosed in NPL 3 has a problem in which, when the output light power of the multi-mode excitation light source is adjusted to cope with the change of the input signal light power of the given core, the gain of the core of which the input signal Light power does not change is changed. In order to solve this problem, for example, NPL 4 proposes a cladding-pumped multi-core fiber EDFA which includes not only the multi-mode excitation light source for cladding pumping but also a core excitation light source for multiplexing the signal light and the excitation light to excite the erbium ion for each core.

CITATION LIST

Non Patent Literature

[NPL 1] "Development of a Compact Erbium Doped Fiber Amplifier with Fast Transient Control", Furukawa Electric Review, Vol. 116, pp. 79-80 (July 2005).
[NPL 2] Sugimoto Ryo, Miyauchi Hidenori, Shima Rensuke, Himeno Kuniharu, Hosoya Hideyuki, Horiuchi Yoshiaki, Tanaka Yoshiaki, Oikawa Yoichi, Shiga Noriyasu, Nagaeda Hiroshi, Fujikura Technical Review, Vol. 1, No. 116, pp 1-5 (July 2009).
[NPL 3] Y. Miura, et al., "Batch Multicore Amplification with Cladddng-Pamped Multicore EDF", ECOC 2012 Technical Digest, paper Tu.4.F.1 (2012).
[NPL 4] M. Yamada et al., "Gain Control in Multi-Core Erbium/Ytterbium-Doped. Fiber Amplifier with Hybrid Pumping", Proc. OECC 2016, paper WC1-2 (2016).

SUMMARY OF THE INVENTION

Technical Problem

According to the cladding-pumped multi-core fiber EDFA disclosed in NPL 4, it becomes possible to perform the gain control, but the above-described problem in which the sharp change of the gain caused by the limited response time period of the LD drive circuit occurs still remains.

As described above, in the conventional optical fiber amplifier, to cope with the change of the input signal light power caused by the change of the number of wavelengths of the WDM signal, it is necessary to adjust the excitation light power at high speed to control the gain at high speed. However, the sharp change of the gain of the EDFA described above causes the sharp change of the signal light power, and leads to the degradation of the transmission characteristics of the optical network. In particular, the multi-core fiber EDFA developed in recent years has a problem in which it is not possible to perform the gain control at the time of the change of the input signal light power due to the sharp change of the gain caused by the limited response time period of the LD drive circuit. In addition, a problem arises in that, in the case where a cutoff wavelength is in the vicinity of or longer than the wavelength of the signal light, when the fiber swings due to the influence of ventilation, an optical signal which propagates in the core of the fiber also swings.

The present invention has been achieved in view of the above-described circumstances, and provides an amplification fiber and an optical amplifier which do not change gain sharply or are capable of suppressing change of the gain even when an input signal light power is sharply changed.

Means for Solving the Problem

An amplification fiber of the present invention is an amplification fiber including: a core which is doped with an erbium ion; and a cladding which surrounds the core and has a refractive index lower than a refractive index of the core, wherein a relative refractive index difference between the core and the cladding is not more than a smaller one of values of a first relative refractive index difference expressed as the following Expression (1) and a second relative refractive index difference expressed as the following Expression (2):

[Math. 1]

$$\Delta n_1 = 75.64 - 280.33a + 443.18a^2 - 372.88a^3 + 175.04a^4 - 43.384a^5 + 4.44a^6 \quad (1)$$

[Math. 2]

$$\Delta n_2 = 13.34a^{-1.98} \quad (2)$$

wherein, in (1) and (2) described above, a denotes a radius [μm] of the core, $\Delta n_1$ denotes the first relative refractive index difference [%], and $\Delta n_2$ denotes the second relative refractive index difference [%].

In the amplification fiber of the present invention, a plurality of the cores may be provided to be spaced apart from each other, each of relative refractive index differences between the plurality of the cores and the cladding may be not more than the smaller one of the values of the first relative refractive index difference and the second relative refractive index difference [%], and the radius of the core may satisfy Expression (5):

[Math. 3]

$$a \geq 2.3 \quad (5)$$

In the amplification fiber of the present invention, the relative refractive index difference between the core and the cladding may be not more than 2.8% in an area of the radius of the core in which the smaller one of the values of the first relative refractive index difference and the second relative refractive index difference is more than 2.8%.

An amplification fiber of the present invention is an amplification fiber including: a core which is doped with an erbium ion; and a cladding which surrounds the core and has a refractive index lower than a refractive index of the core, wherein a relative refractive index difference between the core and the cladding is not more than a smaller one of values of a third relative refractive index difference expressed as the following Expression (3) and a fourth relative refractive index difference expressed as the following Expression (4):

[Math. 4]

$$\Delta n_3 = 45.12 - 134.20a + 160.96a^2 - 87.78a^3 + 18.30a^4 \quad (3)$$

[Math. 5]

$$\Delta n_4 = 13.34a^{-1.98} \quad (4)$$

wherein, in (3) and (4) described above, a denotes a radius [μm] of the core, $\Delta n_3$ denotes the third relative refractive index difference [%], and $\Delta n_4$ denotes the fourth relative refractive index difference [%].

In the amplification fiber of the present invention, a plurality of the cores may be provided to be spaced apart from each other, each of relative refractive index differences between the plurality of the cores and the cladding may be not more than the smaller one of the values of the third relative refractive index difference and the fourth relative refractive index difference [%], and the radius of the core may satisfy Expression (5):

[Math. 6]

$$a \geq 2.3 \quad (5)$$

In the amplification fiber of the present invention, the relative refractive index difference between the core and the cladding may be not more than 2.8% in an area of the radius of the core in which the smaller one of the values of the third relative refractive index difference and the fourth relative refractive index difference is more than. 2.8%.

In the amplification fiber of the present invention, the cladding may have: a first cladding which surrounds the plurality of the cores and has a refractive index lower than the refractive index of the core; and a second cladding which surrounds the first cladding and has a refractive index lower than the refractive index of the first cladding.

The amplification fiber of the present invention may be wound around a bobbin and be bonded to the bobbin.

An optical amplifier of the present invention is an optical amplifier including: the amplification fiber described above; a semiconductor laser light source which emits excitation light input to the amplification fiber; and a feedback circuit which generates current supplied to the semiconductor laser light source from gain detected according to powers of signal light input to the amplification fiber and signal light output from the amplification fiber.

Effects of the Invention

According to the present invention, it is possible to provide the amplification fiber and the optical amplifier which do not change the gain sharply or are capable of suppressing the change of the gain even when the input signal light power is sharply changed.

DESCRIPTION OF EMBODIMENTS

Figure 1:
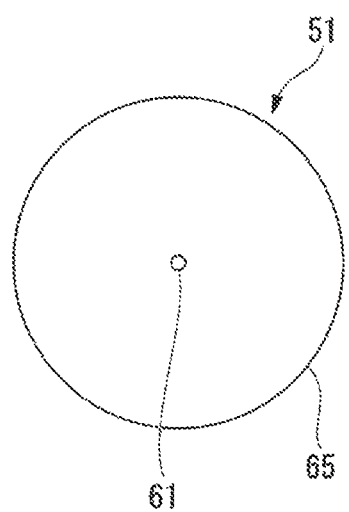
FIG. 1 is a cross-sectional view of an amplification fiber of a first embodiment of the present invention.

Hereinbelow, embodiments of an amplification fiber and an optical amplifier of the present invention will be described with reference to the drawings. Note that, in the present description and the drawings, configurations having the same function are designated by the same reference numeral, and the repeated description thereof will be omitted.

First Embodiment

An amplification fiber 51 of a first embodiment of the present invention is used as, e.g., an amplification medium of an optical fiber amplifier. As shown in FIG. 1, the amplification fiber 51 includes one core 61 and a cladding 65 which surrounds the core 61, and is what is called a single-core erbium-doped fiber. The core 61 is doped with an erbium ion.

Figure 2:
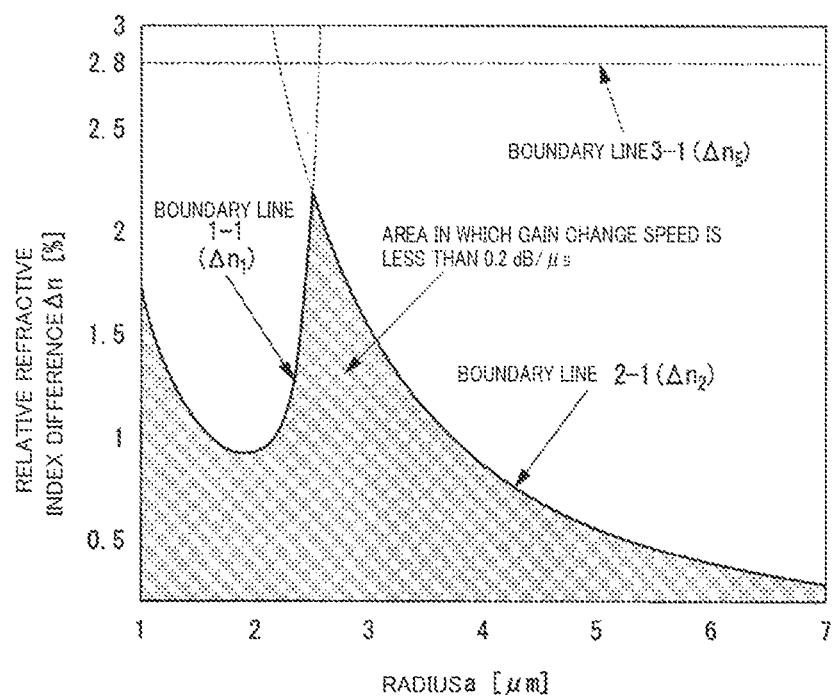
FIG. 2 is a graph showing a relationship between a radius of a core and a relative refractive index difference for indicating an area satisfied by the core and the relative refractive index difference of the amplification fiber shown in FIG. 1.
Figure 3:
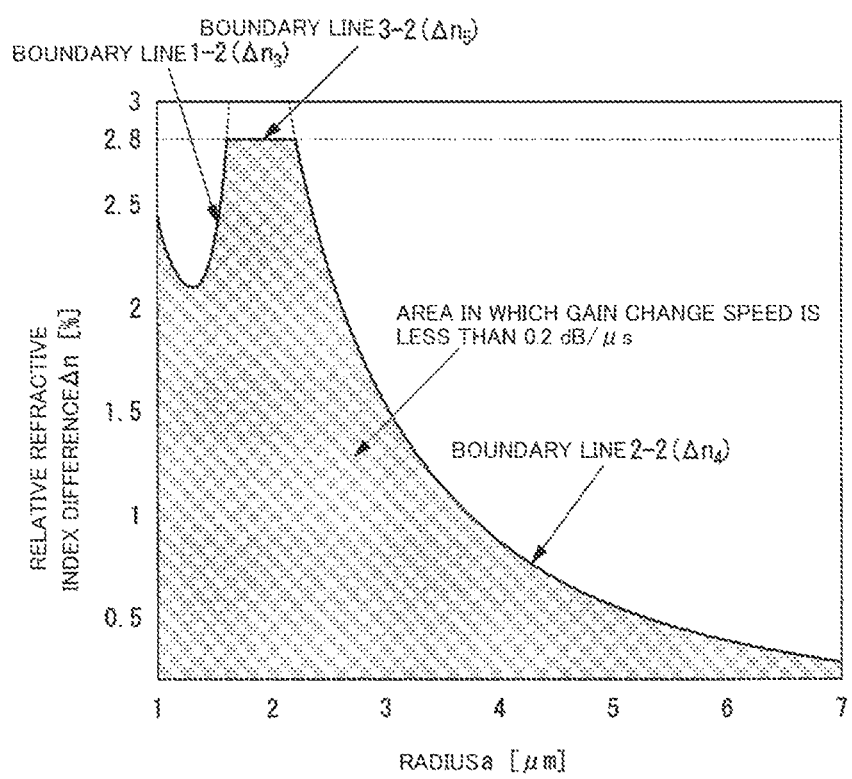
FIG. 3 is another graph showing the relationship between the radius of the core and the relative refractive index difference for indicating the area satisfied by the core and the relative refractive index difference of the amplification fiber shown in FIG. 1.

A relative refractive index difference $\Delta n_{51}$ between the core 61 and the cladding 65 is limited to a shaded area shown in FIG. 2 or 3. A graph in FIG. 2 shows a relationship between the radius of the core and the relative refractive index difference $\Delta n_{51}$ [%] which are numerically calculated on the assumption of the case where the amplification fiber 51 is applied to amplification of C-band signal light. A graph in FIG. 3 shows the relationship between the radius of the core and the relative refractive index difference which are numerically calculated on the assumption of the case where the amplification fiber 51 is applied to amplification of L-band signal light. The above-mentioned C band denotes a frequency band of not less than 1530 nm and not more than 1565 nm, and the L band denotes a frequency band of not less than 1565 nm and not more than 1625 nm. Note that, when a radius a is less than 1 μm, a fiber length required for the amplification of the erbium-doped fiber becomes extremely long. From this, the erbium-doped fiber having the radius a of less than 1 μm is not used substantially, and hence the case where the radius a is not more than 1 μm is not shown in the graph in each of FIGS. 2 and 3.

In order to suppress change of gain to less than 0.2 dB with respect to change of an input signal light power in the amplification fiber 51, a gain change speed immediately after the change of the input signal light power needs to be less than 0.2 dB/μs. This is because the band of each of a feedback control circuit and an LD drive circuit is about 1 MHz. The gain change speed differs depending on the radius a [μm] of the core 61 and the relative refractive index difference $\Delta n_{51}$. When the amplification fiber 51 is applied to the amplification of the C-band signal light, as shown in FIG. 2, as the radius a increases from 1 μm, a relative refractive index difference (first relative refractive index difference) $\Delta n_1$ at which the gain change speed is 0.2 dB/μs is an area smaller than a boundary line 1-1 expressed as the following Expression (1):

[Math. 7]

$$\Delta n_1 = 75.64 - 280.33a + 443.18a^2 - 372.88a^3 + 175.04a^4 - 43.38a^5 + 4.44a^6 \qquad (1).$$

Similarly, when the amplification fiber 51 is applied to the amplification of the L-band signal light, as shown in FIG. 3, as the radius a increases from 1 μm, a boundary line 1-2 of a relative refractive index difference (third relative refractive index difference) $\Delta n_3$ at which the gain change speed is 0.2 dB/μs is an area smaller than the boundary line 1-1 expressed as the following Expression (3):

[Math. 8]

$$\Delta n_3 = 45.12 - 134.20a + 160.96a^2 - 87.78a^3 + 18.30a^4 \qquad (3).$$

In an area in which the relative refractive index difference $\Delta n_{51}$ is smaller than the relative refractive index difference $\Delta n_1$ in the C band, and in an area in which the relative refractive index difference $\Delta n_{51}$ is smaller than a relative refractive index difference $\Delta n_2$ described later in the L band, the gain change speed is about 0.2 dB/μs. In the case where the relative refractive index difference $\Delta n_{51}$ is fixed and the radius a is increased, when the radius a becomes larger than a predetermined radius, the permissible mode of the core 61 becomes a higher-order mode, and the amplification efficiency of the amplification of the signal light in a single mode is reduced due to mode coupling. The predetermined radius mentioned above is changed according to the relative refractive index difference $\Delta n_{51}$. However, in fusion splicing between the amplification fiber 51 and a pigtail fiber (not shown) constituting the optical amplifier, by performing the fusion splicing such that the center of the core 61 matches the center of the core of the pigtail fiber, excitation of higher-order mode light is suppressed at an input end of the amplification fiber 51.

The amplification fiber 51 is wound around a bobbin into a coil shape, and is bonded and fixed to the bobbin with an adhesive or the like. With this, mechanical agitation such as vibration of the amplification fiber 51 caused by, e.g., ventilation is averted. Thus, by preventing the signal light in the single mode from being converted into the signal light in the higher-order mode during propagation in the amplification fiber 51, it is possible to handle the amplification fiber 51 as a single mode fiber (SMF) effectively when a cutoff wavelength is not more than 2 μm.

When the amplification fiber 51 is applied to the amplification of the C-band signal light in an area in which the radius a is larger than the predetermined radius described above, as shown in FIG. 2, a boundary line 2-1 of the relative refractive index difference (second relative refractive index difference) $\Delta n_2$ at which the cutoff wavelength of the amplification fiber 51 is 2 μm is expressed as the following Expression (2):

[Math. 9]

$$\Delta n_2 = 13.34 a^{-1.98} \qquad (2)$$

Similarly, when the amplification fiber 51 is applied to the amplification of the L-band signal light in the area in which the radius a is larger than the predetermined radius described above, as shown in FIG. 3, a boundary line 2-2 of a relative refractive index difference (fourth relative refractive index difference) $\Delta n_4$ at which the cutoff wavelength of the amplification fiber 51 is 2 μm is expressed as the following Expression (4):

[Math. 10]

$$\Delta n_4 = 13.34 a^{-1.98} \qquad (4)$$

As can be seen from FIG. 2, when the amplification fiber 51 is applied to the amplification of the C-band signal light, the relative refractive index difference $\Delta n_{51}$ is not more than the smaller one of the values of the relative refractive index difference $\Delta n_1$ and the relative refractive index difference $\neq n_2$. Similarly, as can be seen from FIG. 3, when the amplification fiber 51 is applied to the amplification of the L-band signal light, the relative refractive index difference $\Delta n_{51}$ is not more than the smaller one of the values of the relative refractive index difference $\Delta n_3$ and the relative refractive index difference $\Delta n_4$. Note that, in the case where the values of the relative refractive index difference $\Delta n_2$ and the relative refractive index difference $\Delta n_2$ are equal to each other, and in the case where the values of the relative refractive index difference $\Delta n_3$ and the relative refractive index difference $\Delta n_4$ are equal to each other, the above-described "smaller one of the values" denotes the values which are equal to each other.

According to the amplification fiber 51 described above, the relative refractive index difference $\Delta n_{51}$ is limited to the shaded area shown in each of FIGS. 2 and 3, and a correlation between the radius a and the relative refractive index difference $\Delta n_{51}$ is thereby limited to an area in which a gain change value satisfies a predetermined reference value at the time of the change of the input signal light power. Herein, the predetermined reference value means a reference value which does not degrade transmission characteristics of an optical network, and is, e.g., less than 0.2 dB. The correlation between the radius a and the relative refractive index difference $\Delta n_{51}$ is limited as described above, whereby, the gain change can be suppressed to less than 0.2 dB when gain control based on feedback control is performed to cope with the change of the input signal light power caused by the change of the number of wavelengths of WDM signal light.

Note that, in FIG. 3, the boundary line 1-2 and the boundary line 2-2 intersect each other in an area of $\Delta n > 2.8\%$. However, even when quartz glass, or tellurite glass or bismuth oxide glass which has a refractive index higher than that of quartz glass is used, it is difficult to implement $\Delta n_{51} > 2.8\%$ with a glass fiber. From this, in light of practicality of the amplification fiber 51, in the area of the radius a in which the boundary line 1-2 and the boundary line 2-2 intersect each other with $\Delta n > 2.8\%$, the relative refractive index difference $\Delta n_{51}$ is not more than 2.8%. In FIGS. 2 and 3, conditions for $\Delta n = 2.8\%$ to be satisfied are shown as boundary lines 3-1 and 3-2 of a relative refractive index $\Delta n_5$.

Figure 4:
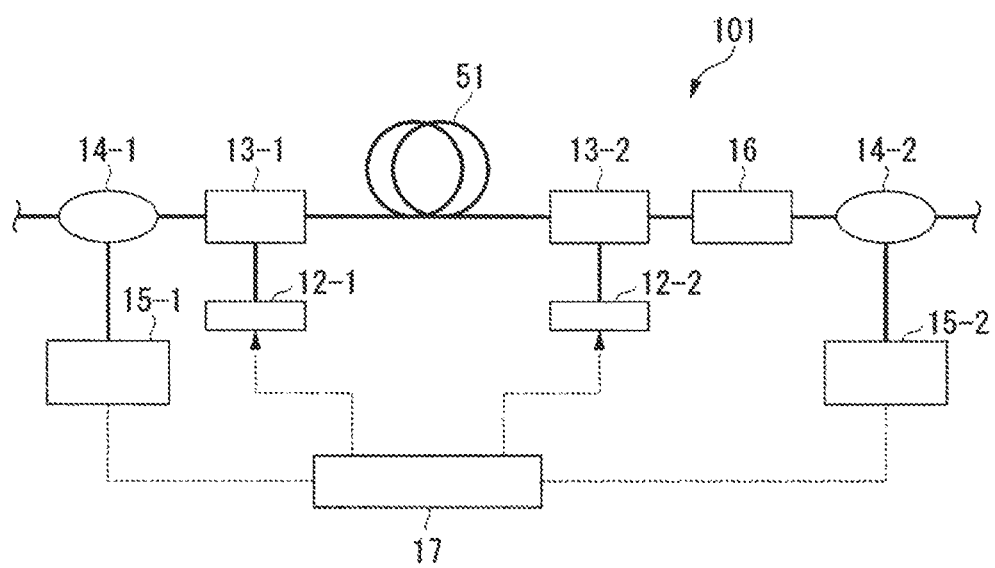
FIG. 4 is a schematic view of ac optical amplifier of the first embodiment of the present invention.

An optical amplifier 101 shown in FIG. 4 includes, in addition to the amplification fiber 51 described above, LD light sources (semiconductor laser light sources) 12-1 and 12-2, multiplexer/demultiplexers 13-1 and 13-2, optical branching devices 14-1 and 14-2, photodetectors 15-1 and 15-2, a gain equalizer 16, and a feedback circuit 17. Each of the LD light sources 12-1 and 12-2 emits excitation light input to the amplification fiber 51. Each of the multiplexer/demultiplexers 13-1 and 13-2 includes an optical isolator which is not shown, and multiplexes or demultiplexes signal light and excitation light. Each of the optical branching devices 14-1 and 14-2 causes part of input light to branch. Each of the photodetectors 15-1 and 15-2 converts the light caused to branch by each of the optical branching devices 14-1 and 14-2 to current or voltage according to the power of the light. The gain equalizer 16 equalizes wavelength dependence of gain of the amplification fiber 51. The feedback circuit 17 calculates the gain by using detection results in the photodetectors 15-1 and 15-2, and generates adjustment current (current) supplied to the LD light sources 12-1 and 12-2 from the calculation result.

The feedback circuit 17 adjusts drive current to each of the LD light sources 12-1 and 12-2 such that the gain calculated from detected values of the photodetectors 15-1 and 15-2 is constant when the input signal light power is changed, and the gain control in the optical amplifier 101 is thereby performed.

Figure 5:
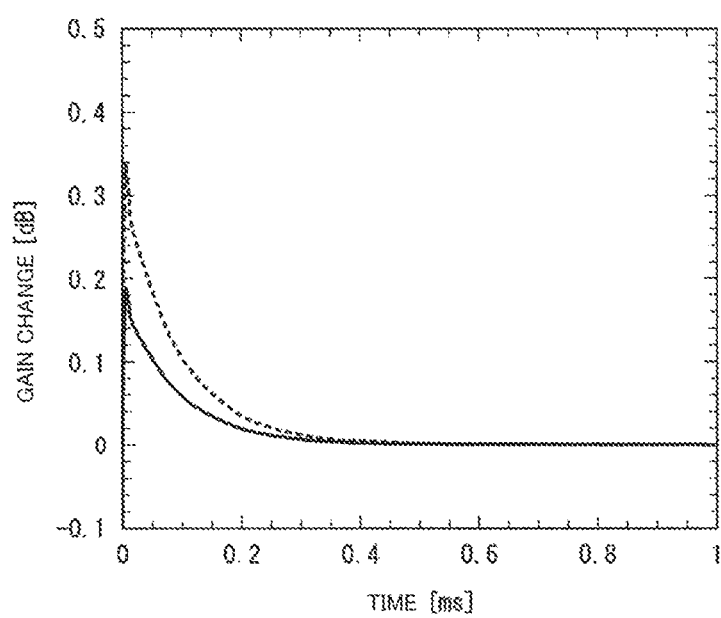
FIG. 5 is a graph showing gain change with respect to elapsed time in the optical amplifier shown in FIG. 4.

A solid line in FIG. 5 indicates the state of the gain control of one wavelength which has remained when the number of wavelengths of the signal light has been changed from 40 to 1 in the optical amplifier 101 based on the assumption that the radius a is 2 μm, the relative refractive index difference $\Delta n_{s1}$ is 0.8%, and the signal light is in the C band. A broken line in FIG. 5 indicates, as a reference, the state of the gain control of the optical amplifier 101 which uses an erbium-doped fiber having the radius a of 2 μm and the relative refractive index difference $\Delta n$ of 1.5% instead of the amplification fiber 51, and has other conditions similar to those of the state indicated by the solid line. The condition that the radius a is 2 μm and the relative refractive index difference $\Delta n_{s1}$ is 0.8% is in the shaded area in FIG. 2, but the condition that the radius a is 2 μm and the relative refractive index difference $Ln_{s1}$ is 1.5% is outside the shaded area in FIG. 2. As indicated by the solid line in FIG. 5, in the case where the amplification fiber 51 having the radius a of 2 μm and the relative refractive index difference $\Delta n_{s1}$ 0.8% is used, the maximum value of the gain change is lower than 0.2 dB. On the other hand, in the case where the erbium-doped fiber having the radius a of 2 μm and the relative refractive index difference $\Delta n$ of 1.5% is used, it can be seen that the gain change reaches up to about 0.35 dB. From this result, according to the amplification fiber 51, it is possible to determine that, when the gain control based on the feedback control is performed to cope with the change of the input signal light power caused by the change of the number of wavelengths of the WDM signal light, the gain change can be suppressed to less than 0.2 dB.

In addition, in the configuration in which the signal light was in the C band in the optical amplifier 101, the excitation light power required for a gain of 25 dB in the case where the amplification fiber 51 which satisfied the condition in the shaded area in FIG. 2 and had the radius a of 3.5 μm and the relative refractive index difference $\Delta n_{s1}$ of 0.8% was used was compared with the excitation light power required for a gain of 25 dB in the case where the erbium-doped fiber which had the radius a of 3.5 μm and the relative refractive index difference $\Delta n$ of 1.5% was used. As a result, in the amplification fiber 51 having the radius a of 3.5 μm and the relative refractive index difference $\Delta n_{s1}$ of 0.8%, the excitation light power which was nine times the excitation light power of the erbium-doped fiber having the radius a of 3.5 μm and the relative refractive index difference $\Delta n$ of 1.5% was required, and the cutoff wavelength exceeded 2 μm.

Further, in the case where the amplification fiber 51 having the radius a of 3.5 μm and the relative refractive index difference $\Delta n_{s1}$ of 0.8% was simply wound around a bobbin, the gain temporally fluctuated from a normal value by about (+ −) 0.8 dB under an environment of ventilation of 1 m/s. The above (+ −) represents plus and minus signs. In contrast to this, in the case where the above-described amplification fiber 51 was wound around the bobbin and was bonded and fixed to the bobbin, it was determined that the gain did not change from the normal value.

Second Embodiment

Figure 6:
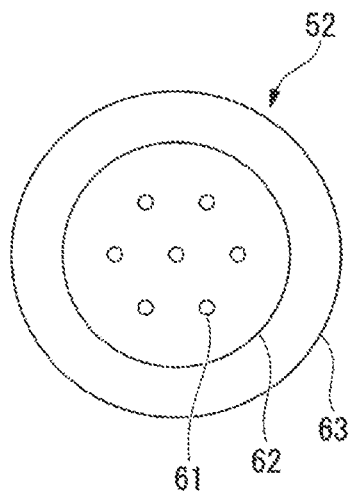
FIG. 6 is a cross-sectional view of an amplification fiber of a second embodiment of the present invention.

As shown in FIG. 6, an amplification fiber 52 of a second embodiment of the present invention includes seven cores 61 which are disposed at regular intervals, and a cladding 65 which surrounds the cores 61. The cladding 65 includes a first cladding (cladding) 62 which surrounds the seven cores 61 without any gap, and a second cladding 63 which surrounds the first cladding 62.

The refractive index of the first cladding 62 is lower than the refractive index of the core 61. The first cladding 62 propagates the excitation light, and is able to collectively excite erbium ions with which all of the cores 61 are doped with the excitation light. The refractive index of the second cladding 63 is lower than the refractive index of the first cladding 62. The amplification fiber 52 is a multi-core erbium-doped fiber having a double cladding structure. Each of relative refractive index differences $\Delta n_{s2}$ and $\Delta n_{s3}$ of the amplification fibers 52 and 53 denotes the relative refractive index difference between the core 61 and the first cladding 62.

Figure 7:
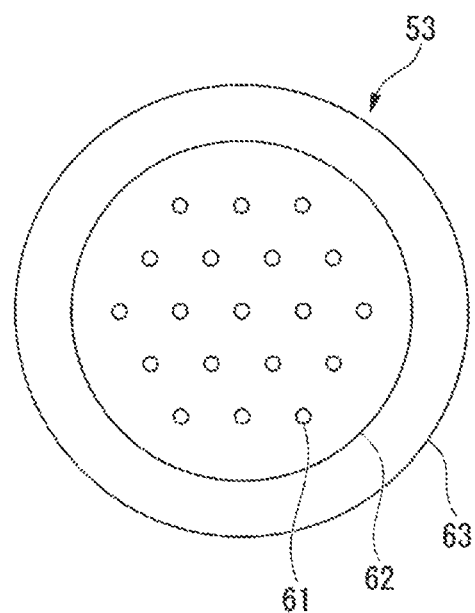
FIG. 7 is a cross-sectional view showing a modification of the amplification fiber shown in FIG. 6.

The amplification fiber 53 shown in FIG. 7 is a modification of the amplification fiber 52, and includes nineteen cores 61 which are disposed at regular intervals, and a cladding 65 which surrounds the cores 61.

Figure 8:
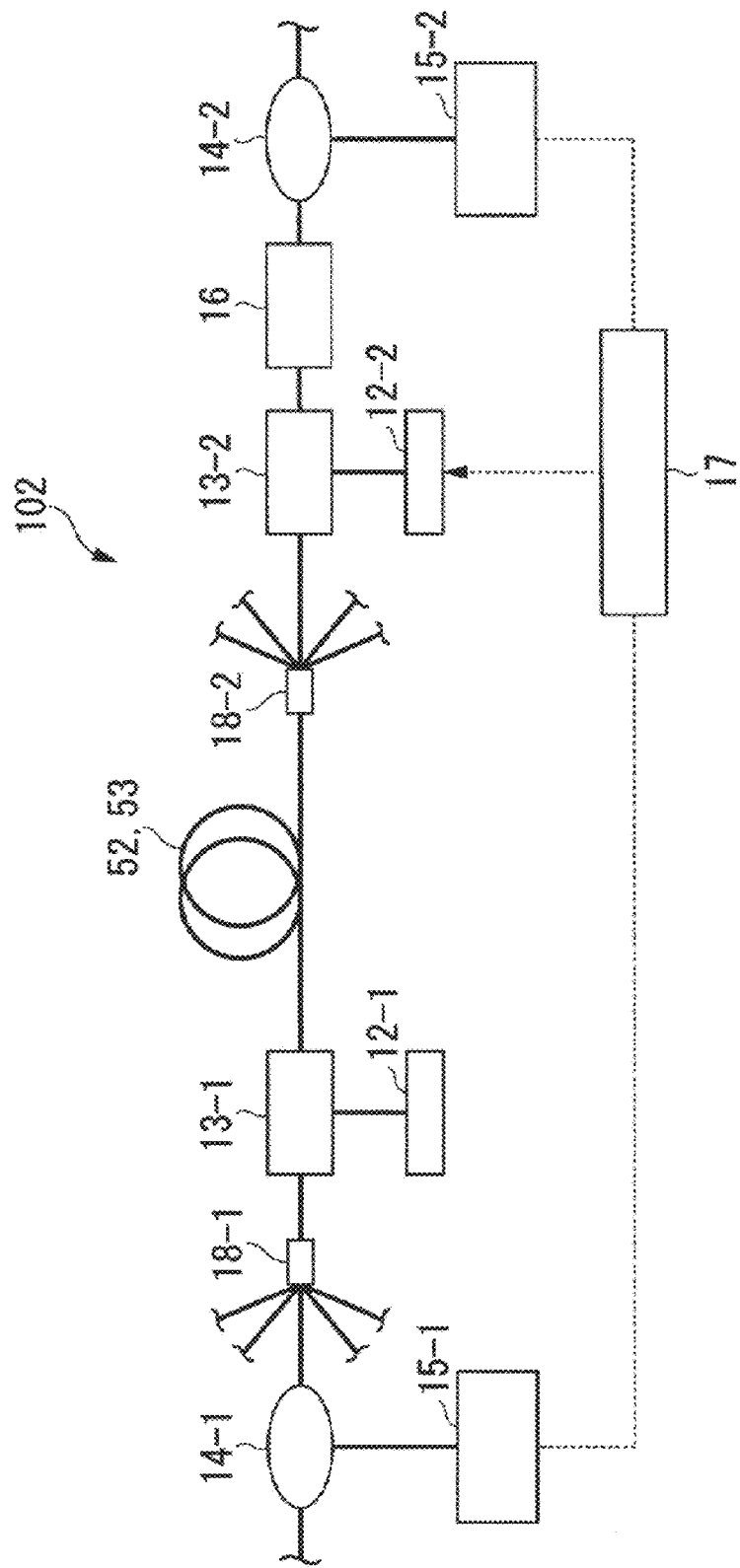
FIG. 8 is a schematic view of an optical amplifier including the amplification fiber shown in FIG. 6 or 7.

An optical amplifier 102 shown in FIG. 8 includes, in addition to the amplification fiber 52 or the amplification fiber 53, LD light sources 12-1 and 12-2, multiplexer/demultiplexers 13-1 and 13-2, optical branching devices 14-1 and 14-2, photodetectors 15-1 and 15-2, a gain equalizer 16, and a feedback circuit 17. Note that the feedback circuit 17 calculates the gain by using detection results in the photodetectors 15-1 and 15-2, and generates only the adjustment current supplied to the LD light source 12-2 from the calculation result, as will be described later.

The optical amplifier 108 further includes a fan-in component 18-1 and a fan-out component 18-2. The fan-in component 18-1 is provided between the multiplexer-demultiplexer 13-1 and the optical branching device 14-1, and performs conversion from a single-core fiber to a multi-core fiber. The fan-out component 18-2 is disposed between an end portion of the amplification fiber 52 or the amplification fiber 53 on a side opposite to the multiplexer/demultiplexer 13-1 and the multiplexer/demultiplexer 13-2, and performs conversion from the multi-core fiber to the single-core fiber. The LD light source 12-1 is a multi-mode LD. The excitation light of the LID light source 12-1 is coupled to the first cladding 62 of the amplification fiber 52 or the amplification fiber 53 via the multiplexer/demultiplexer 13-1, and is used as cladding pumping light. On the other hand, the LD light source 12-2 is a single-mode LD. The excitation light of the LID light source 12-2 is multiplexed with the signal light by the multiplexer/demultiplexer 13-2, is input to the core 61 of the amplification fiber 52 or the amplification fiber 53, and is used as core excitation light. The feedback circuit 17 adjusts only the drive current to the LD light source 12-2 such that the gain calculated from the detected values of the photodetectors 15-1 and 15-2 is constant when the input signal light power is changed, and the gain control is thereby performed. At this point, the drive current of the LD light source 12-1 is kept constant.

Figure 9:
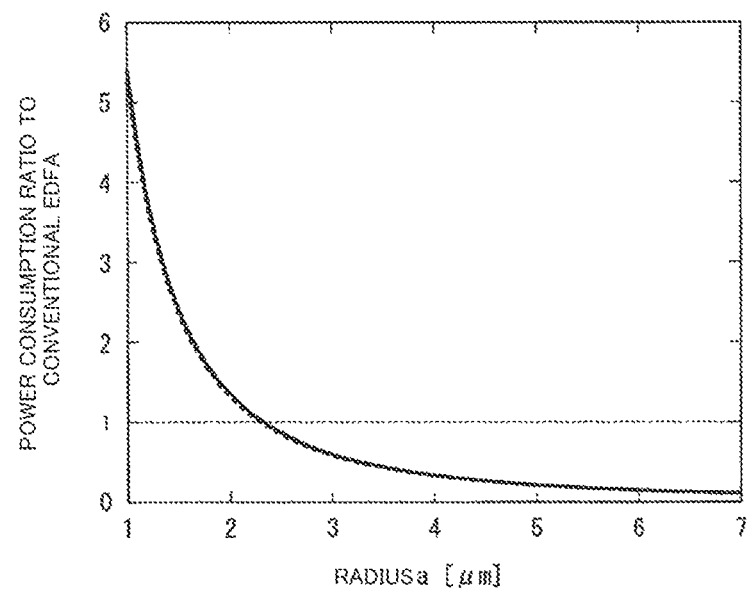
FIG. 9 is a graph showing a relationship between a radius of a core and a power consumption ratio of the optical amplifier shown in FIG. 8 conventional EDFA.

The multi-core EDFA which uses cladding pumping requires only one light source for the cladding pumping, and hence a low power consumption effect of being able to reduce the power consumption of the optical amplifier is achieved. However, when the radius of the core of the erbium-doped fiber is smaller than a predetermined radius, the low power consumption effect cannot be achieved. This is because, when the radius of the core is small, the erbium ion with which the core is doped cannot absorb the excitation light propagating in the first cladding adequately, the excitation light power which is not used in amplification is increased, and the power consumption of the optical ampler is thereby increased. The radius of the core of a boundary for determining the presence or absence of the low power consumption effect is 2.3 µm. FIG. 9 shows evidence that the boundary of the presence or absence of the low power consumption effect is the radius a=2.3 µm.

As shown in FIG. 9, a power consumption ratio to the conventional EDFA is plotted with respect to the core radius. The power consumption ratio to the conventional EDFA is calculated by dividing the power consumption of the amplification fiber 52 or the amplification fiber 53 serving as the multi-core EDFA which uses the cladding pumping by a value obtained by the power consumption of the single-core EDFA having equivalent amplification characteristics×the number of cores of the multi-core EDFA. A solid line in 9 indicates the result of calculation of the power consumption of the amplification fiber 52. A broken line in FIG. 9 indicates the result of calculation of the power consumption of the amplification fiber 53. The sold line and the broken line in FIG. 9 substantially coincide with each other. The power consumption ratio of each of the amplification fibers 52 and 53 to the conventional EDFA is less than 1 when the radius a is not less than 2.3 µm. When the radius a is not less than 2.3 µm, the amplification fiber 52 or the amplification fiber 53 achieves the low power consumption effect.

Figure 10:
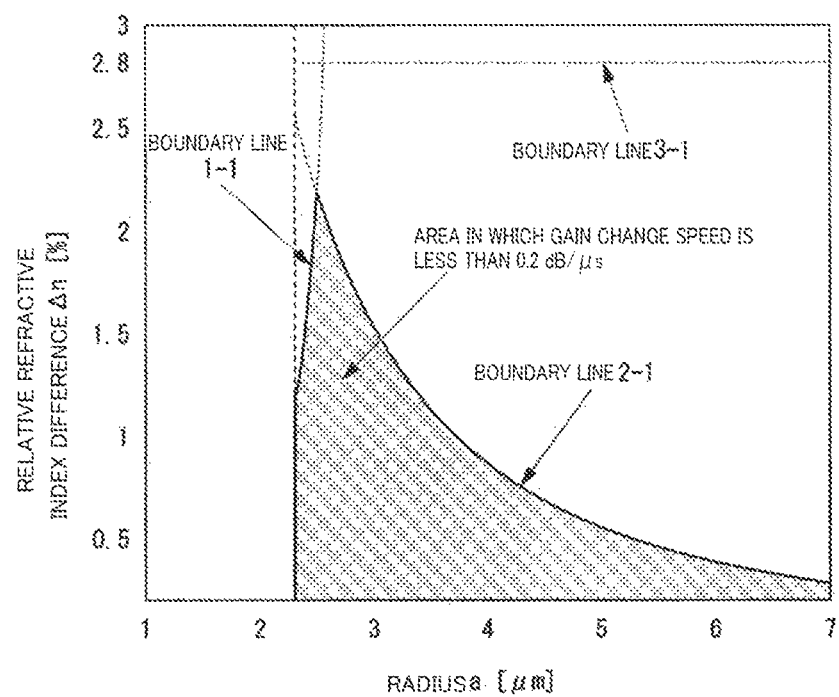
FIG. 10 is a graph showing a relationship between a radius of a core and a relative refractive index difference for indicating an area satisfied by the core and the relative refractive index difference of the amplification fiber shown in FIG. 6 or 7.
Figure 11:
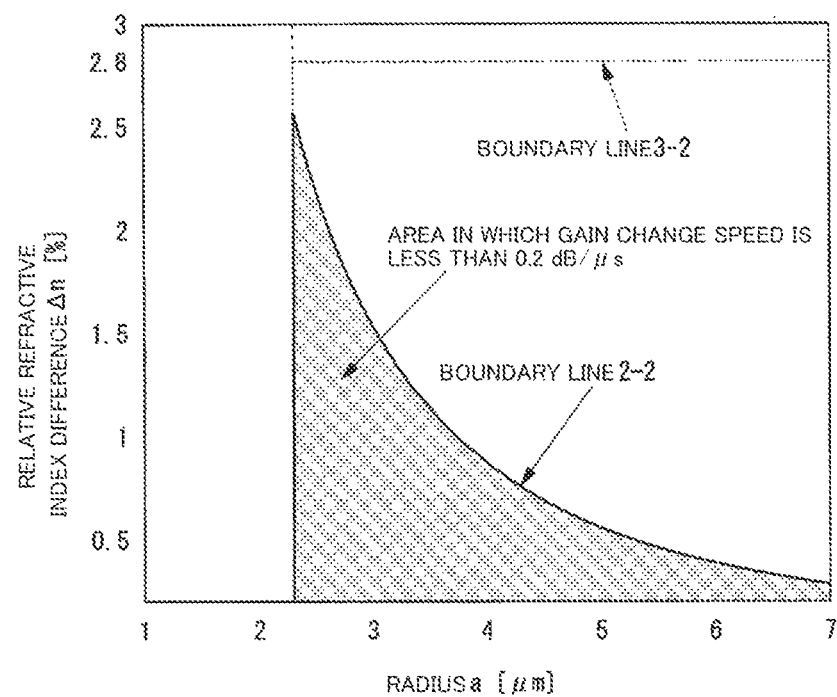
FIG. 11 is another graph showing the relationship between the radius of the core and the relative refractive index difference for indicating the area satisfied by the core and the relative refractive index difference of the amplification fiber shown in FIG. 6 or 7.

Consequently, in the amplification fiber 52 or the amplification fiber 53, the limited area of the radius a and the relative refractive index difference $\Delta n_{52}$ or $\Delta n_{53}$ in which the gain change speed of 0.2 dB/µs is obtained corresponds to an area obtained by limiting the shaded area in each of FIGS. 2 and 3 with a limitation in which the radius a is not less than 2.3 µm, as shown in FIGS. 10 and 11. That is, FIG. 10 shows the limited area of the radius a and the relative refractive index difference $\Delta n_{52}$ or $\Delta n_{53}$ in the case where the amplification fiber 52 or the amplification fiber 53 is applied to the amplification of the C-band signal light. FIG. 11 shows the limited area of the radius a and the relative refractive index difference $\Delta n_{52}$ or $\Delta n_{53}$ in the case where the amplification fiber 52 or the amplification fiber 53 is applied to the amplification of the L-band signal light. As shown in FIG. 11, in the case where the amplification fiber 52 or the amplification fiber 53 is applied to the amplification of the L-band signal light, the boundary line 1-2 is in an area in which the radius a is less than 2.3 µm, and does not appear in the shaded limited area.

Figure 12:
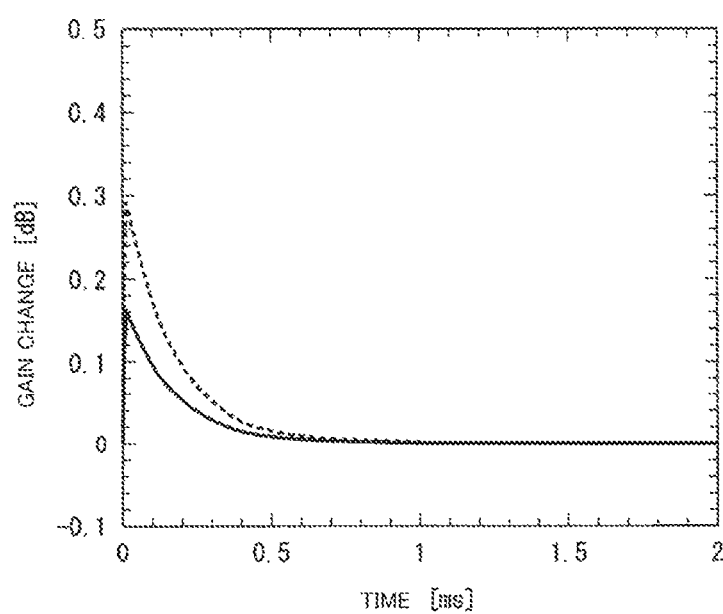
FIG. 12 is a graph showing gain change with respect to elapsed time in the optical amplifier shown in FIG. 8.
Figure 13:
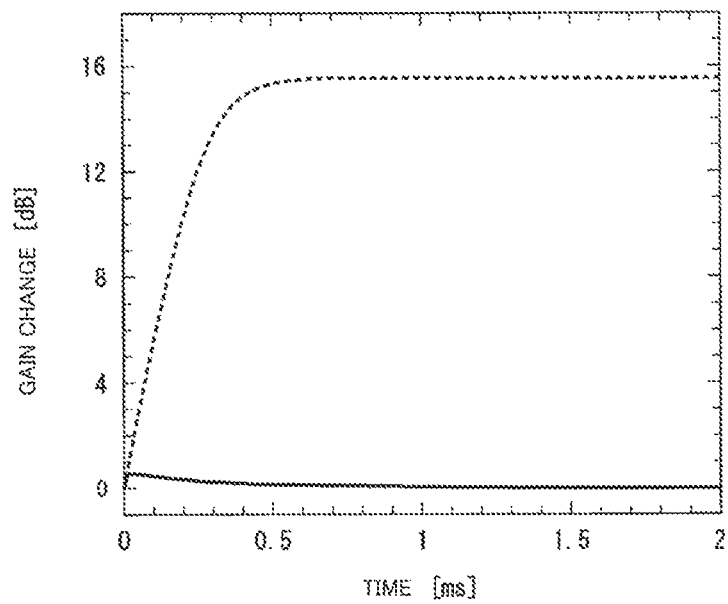
FIG. 13 is a graph showing gain change with respect to elapsed time in a conventional optical amplifier.

A solid line in FIG. 12 indicates the state of the Gain control of one wavelength which has remained when the number of wavelengths of the signal light has changed from 40 to 1 in the case where the signal light is in the C band in the optical amplifier 102 which uses the amplification fiber 52 or 53 having the radius a of 2.4 µm and the relative refractive index difference $\Delta n_{52}$ or $\Delta n_{53}$ of 1.7%. A broken line in FIG. 12 indicates, as a reference, the state of the gain control in the case where the erbium-doped fiber having the radius a of 2.4 µm and the relative refractive index difference $\Delta n$ of 2.0 is used instead of the amplification fiber 52 or 53. The condition that the radius a is 2.4 µm and the relative refractive index difference $\Delta n_{52}$ or $\Delta n_{53}$ is 1.7% is in a shaded area shown in FIG. 10. However, the condition that the radius a is 2.4 µm and the relative refractive index difference $\Delta n_{52}$ or $\Delta n_{53}$ is 2.0% is outside the shaded area shown in FIG. 10. As indicated by the solid line in FIG. 12, in the case where the amplification fiber 52 or 53 is used, the maximum value of the gain change is lower than 0.2 dB. On the other hand, as indicated by the broken line in FIG. 12, in the case where the erbium-doped fiber having the radius a of 2.4 µm and the relative refractive index difference $\Delta n_{52}$ or $\Delta n_{53}$ of 2.0% is used, the maximum value of the gain change is about 0.3 dB and is higher than 0.2 dB. From this result, according to the amplification fibers 52 and 53, it can be seen that, when the gain control based on the feedback control is performed to cope with the change of the input signal light power caused by the change of the number of wavelengths of the WDM signal light, the gain change can be suppressed to less than 0.2 dB.

In the configuration of the optical amplifier 102, the core excitation light power required for the gain change of 25 dB in the case where the amplification fiber 52 or 53 having the radius a of 3.5 µm and the relative refractive index difference $\Delta n_{52}$ or $\Delta n_{53}$ of 0.8% in the shaded area shown in FIG. 10 was used was compared with the core excitation light power required for the gain change of 25 dB in the case where the erbium-doped fiber having the radius a of 3.5 µm and the relative refractive index difference $\Delta n$ of 1.5% was used. As a result, in the erbium-doped fiber having the radius a of 3.5 µm and the relative refractive index difference $\Delta n$ of 1.5%, the core excitation light power which was seven times the core excitation light power of the amplification fiber 52 or 53 having the radius a of 3.5 µm and the relative refractive index difference $\Delta n_{52}$ or $\Delta n_{53}$ of 0.8% was required, and the cutoff wavelength exceeded 2 µm. Further, in the case where the amplification fiber 52 or 53 having the radius a of 3.5 µm and the relative refractive index difference $\Delta n_{52}$ or $\Delta n_{53}$ of 0.8% was simply wound around the bobbin, the gain temporally fluctuated from the normal value by about ±0.8 dB under an environment of ventilation of 1 m/s. In contrast to this, in the case where the above-described amplification fiber 52 or 53 was wound around the bobbin, was bonded and fixed to the bobbin, and was used, the gain did not change from the normal value. Similarly to the amplification fiber 51 of the first embodiment, it was determined that it was possible to suppress the change of the gain in the case where the amplification fiber 52 or 53 was wound around the bobbin and was bonded and fixed to the bobbin.

As described above, according to the amplification fibers 51, 52, and 53 and the optical amplifiers 101 and 102 according to the first embodiment and the second embodiment, even when the input signal light power is sharply changed, the gain is prevented from being sharply changed, and the change of the gain can be suppressed to not more than 0.2 dB.

While the preferred embodiments of the present invention have been described, the present invention is not limited to the above-described embodiments. The configuration of the present invention can be changed as long as the objects and effects described above can be achieved. In addition, specific structures and shapes when the present invention is implemented may be other structures and shapes as long as the objects and effects of the present invention can be achieved.

REFERENCE SIGNS LIST

51, 52, 53 Amplification fiber
61 Core
62 First cladding (cladding)
65 Cladding
101, 102 Optical amplifier
a Radius
$\Delta n_{51}$, $\Delta n_{52}$, $\Delta n_{52}$ Relative refractive index difference

The invention claimed is:

1. An amplification fiber comprising:
a core which is doped with an erbium ion; and
a cladding which surrounds the core and has a refractive index lower than a refractive index of the core, wherein a relative refractive index difference between the core and the cladding is not more than a smaller one of values of a first relative refractive index difference expressed as the following Expression (1) and a second relative refractive index difference expressed as the following Expression (2):

[Math. 1]
$$\Delta n_1 = 75.64 - 280.33a + 443.18a^2 - 372.88a^3 + 175.04a^4 - 43.384a^5 + 4.44a^6 \quad (1)$$

[Math. 2]
$$\Delta n_2 = 13.34a^{-1.98} \quad (2)$$

wherein, in (1) and (2) described above, a denotes a radius [μ] of the core, $\Delta n_1$ denotes the first relative refractive index difference [%], and $\Delta n_2$ denotes the second relative refractive index difference [%] and, wherein the amplification fiber is wound around a bobbin and is bonded to the bobbin,
wherein a correlation between the radius a and the relative refractive index difference exists in a portion of the core in which a gain change value satisfies a threshold value, and the gain change value is a difference between a first wavelength dependence gain resulting from a first input signal light applied to the amplification fiber and a second wavelength dependence gain resulting from a second input signal light applied to the amplification fiber, the first input signal light and the second input signal light each comprising different wavelengths.

2. The amplification fiber according to claim 1, wherein a plurality of the cores are provided to be spaced apart from each other, each of relative refractive index differences between the plurality of the cores and the cladding is not more than the smaller one of the values of the first relative refractive index difference and the second relative refractive index difference, and the radius of the core satisfies Expression (5):

[Math. 3]
$$a \geq 2.3 \quad (5).$$

3. The amplification fiber according to claim 1, wherein the relative refractive index difference between the core and the cladding is not more than 2.8% in an area of the radius of the core in which the smaller one of the values of the first relative refractive index difference and the second relative refractive index difference is more than 2.8%.

4. An amplification fiber comprising:
a core which is doped with an erbium ion; and
a cladding which surrounds the core and has a refractive index lower than a refractive index of the core, wherein a relative refractive index difference between the core and the cladding is not more than a smaller one of values of a third relative refractive index difference expressed as the following Expression (3) and a fourth relative refractive index difference expressed as the following Expression (4):

[Math. 4]
$$\Delta n_3 = 45.12 - 134.20a + 160.96a^2 - 87.78a^3 + 18.30a^4 \quad (3)$$

[Math. 5]
$$\Delta n_4 = 13.34a^{-1.98} \quad (4)$$

wherein, in (3) and (4) described above, a denotes a radius [μ] of the core, $\Delta n_3$ denotes the third relative refractive index difference [%], and $\Delta n_4$ denotes the fourth relative refractive index difference [%] and, wherein the amplification fiber is wound around a bobbin and is bonded to the bobbin,
wherein a correlation between the radius a and the relative refractive index difference exists in a portion of the core in which a gain change value satisfies a threshold value, and the gain change value is a difference between a first wavelength dependence gain resulting from a first input signal light applied to the amplification fiber and a second wavelength dependence gain resulting from a second input signal light applied to the amplification fiber, the first input signal light and the second input signal light each comprising different wavelengths.

5. The amplification fiber according to claim 4, wherein a plurality of the cores are provided to be spaced apart from each other, each of relative refractive index differences between the plurality of the cores and the cladding is not more than the smaller one of the values of the third relative refractive index difference and the fourth relative refractive index difference, and the radius of the core satisfies Expression (5):

[Math. 6]
$$a \geq 2.3 \quad (5).$$

6. The amplification fiber according to claim 4, wherein the relative refractive index difference between the core and the cladding is not more than 2.8% in an area of the radius of the core in which the smaller one of the values of the third relative refractive index difference and the fourth relative refractive index difference is more than 2.8%.

7. The amplification fiber according to claim 2, wherein the cladding includes:
a first cladding which surrounds the plurality of the cores and has a refractive index lower than the refractive index of the core; and
a second cladding which surrounds the first cladding and has a refractive index lower than the refractive index of the first cladding.

8. An optical amplifier comprising:
an amplification fiber comprising:
a core which is doped with an erbium ion; and
a cladding which surrounds the core and has a refractive index lower than a refractive index of the core, wherein a relative refractive index difference between the core and the cladding is not more than a smaller one of values of a first relative refractive index difference expressed as the following Expression (1) and a second relative refractive index difference expressed as the following Expression (2):

[Math. 1]

$$\Delta n_1 = 75.64 - 280.33a + 443.18a^2 - 372.88a^3 + 175.04a^4 - 43.384a^5 + 4.44a^6 \quad (1)$$

[Math. 2]

$$\Delta n_2 = 13.34a^{-1.98} \quad (2)$$

wherein, in (1) and (2) described above, a denotes a radius [μm] of the core, $\Delta n_1$ denotes the first relative refractive index difference [%], and $\Delta n_2$ denotes the second relative refractive index difference [%]and, wherein the amplification fiber is wound around a bobbin and is bonded to the bobbin, wherein a correlation between the radius a and the relative refractive index difference exists in a portion of the core in which a gain change value satisfies a threshold value, and the gain change value is a difference between a first wavelength dependence gain resulting from a first input signal light applied to the amplification fiber and a second wavelength dependence gain resulting from a second input signal light applied to the amplification fiber, the first input signal light and the second input signal light each comprising different wavelengths;

a semiconductor laser light source which emits excitation of the first input signal light to the amplification fiber; and a feedback circuit which generates current supplied to the semiconductor laser light source from the first wavelength dependence gain detected according to powers of the first input signal light input to the amplification fiber and signal light output from the amplification fiber.

9. The optical amplifier according to claim 8, wherein a plurality of the cores are provided to be spaced apart from each other, each of relative refractive index differences between the plurality of the cores and the cladding is not more than the smaller one of the values of the first relative refractive index difference and the second relative refractive index difference, and the radius of the core satisfies Expression (5):

[Math. 3]

$$a \geq 2.3 \quad (5)$$

10. The optical amplifier according to claim 8, wherein the relative refractive index difference between the core and the cladding is not more than 2.8% in an area of the radius of the core in which the smaller one of the values of the first relative refractive index difference and the second relative refractive index difference is more than 2.8%.

11. The amplification fiber according to claim 1, wherein the gain change value satisfies the threshold value comprises the gain change value is less than 0.2 dB.

12. The amplification fiber according to claim 1, wherein the amplification fiber is bonded to the bobbin using an adhesive.

* * * * *